(No Model.)
A. F. COOK.
LIQUID MIXING MACHINE.
No. 537,384. Patented Apr. 9, 1895.
Fig. I.
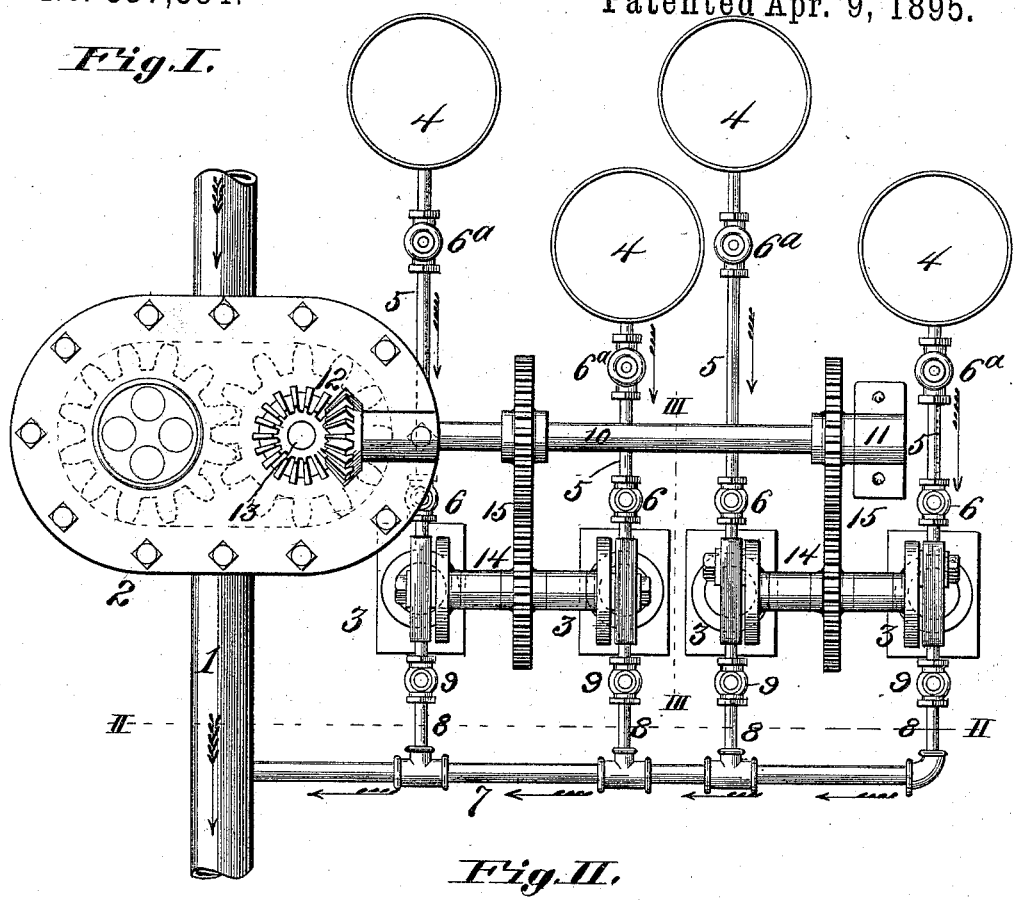
Fig. II.
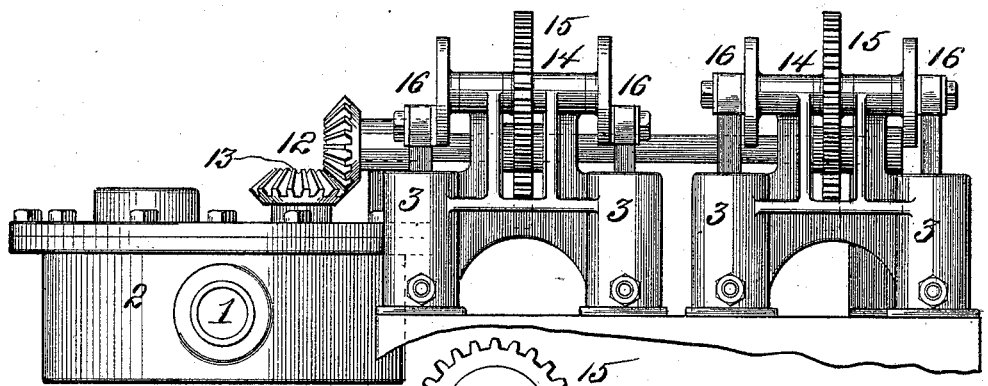
Fig. III.
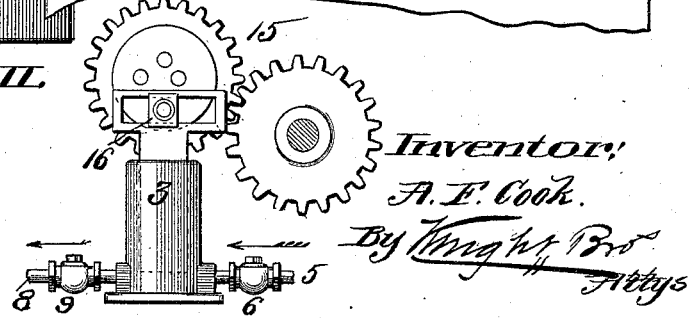
Attest:
E. S. Knight
H. Finley
Inventor:
A. F. Cook.
By Knight Bros
Attys

United States Patent Office.

ALFRED F. COOK, OF ST. LOUIS, MISSOURI, ASSIGNOR TO NANCY E. COOK, OF SAME PLACE.

LIQUID-MIXING MACHINE.

SPECIFICATION forming part of Letters Patent No. 537,384, dated April 9, 1895.

Application filed October 4, 1894. Serial No. 524,916. (No model.)

*To all whom it may concern:*

Be it known that I, ALFRED F. COOK, of the city of St. Louis, State of Missouri, have invented a certain new and useful Improvement in Liquid-Mixing Machines, of which the following is a full, clear, and exact description, reference being had to the accompanying drawings, forming part of this specification.

My invention relates to an improved machine for mixing with a liquid contained in a main pipe other liquids contained in vessels, the force of the liquid passing through the main pipe being utilized as the motive power for causing the liquid to pass from the vessels to the main pipe.

My invention consists in features of novelty hereinafter fully described and pointed out in the claims.

Figure I is a top or plan view illustrative of my invention. Fig. II is an elevation the pipes being in section on line II—II, Fig. I. Fig. III is a section on line III—III, Fig. I, one of the pumps and its gearing being shown in elevation.

Referring to the drawings, 1 represents a main water or other liquid supply pipe, and 2 a meter located in said pipe for measuring the liquid passing therethrough.

3 represents one or more (I have shown four), ordinary pumps, communicating on the supply side with tanks or vessels 4 through means of pipes 5 supplied with check valves 6 and cut-off valves $6^a$, and communicating on the discharge side with the pipe 1, through means of a pipe 7 and branches 8 having check valves 9.

10 represents the main shaft journaled in boxes 11 and having beveled gear connection 12 with the shaft 13 of one of the meter wheels.

14 represents counter shafts having gear connection 15 with the main shaft 10. The shafts 14 have suitable crank or eccentric connection 16 with the pump pistons, as shown in Figs. II and III. It will thus be observed that as the liquid passes through the meter located in the main pipe motion will be imparted from the meter to the pumps through means of the described mechanism, and liquid will be drawn from the tanks or vessels 4 and discharged into the pipe 1, being there mixed with the liquid passing through the main pipe.

When the valves $6^a$ are adjusted to get the desired proportion of mixtures, it will be observed that this proportion will be maintained regardless of the speed of the liquid passing through the main pipe, for if the speed of this liquid increases then the pumps will be worked correspondingly faster, and if the speed diminishes the pumps will be worked correspondingly slower, so that in addition to the advantage of utilizing the force or pressure of the liquid passing through the main pipe, I have also the advantage of a constantly uniform mixture of the liquids.

The apparatus may be used for numerous purposes where it is desired to mix together two or more different kinds of liquids.

I claim as my invention—

1. In a device for mixing liquids, the combination of a main supply pipe, a meter located in the said pipe, a liquid vessel or tank, a pump connected with said vessel or tank for drawing water therefrom, pipes forming a communication between the pump and main supply pipe, and suitable gearing between the meter and pump, whereby the passage of liquid through the meter will operate the pump and draw the liquid from the vessel or tank substantially as and for the purpose set forth.

2. In a device for mixing liquids, the combination of a main supply pipe, a meter located in said pipe, a main shaft geared to the meter, tanks or vessels, and pumps connected therewith, valves placed in said connection, suitable gearing between the main shaft and said pumps so that the pumps may be operated thereby, and pipes with valves forming a communication between said pumps and main pipe, substantially as set forth.

ALFRED F. COOK.

In presence of—
    E. S. KNIGHT,
    M. FINLEY.